No. 896,172.
A. THOMAS.
TRAIN OF CONVEYER ROLLS.
APPLICATION FILED NOV. 1, 1907.
PATENTED AUG. 18, 1908.
2 SHEETS—SHEET 2.
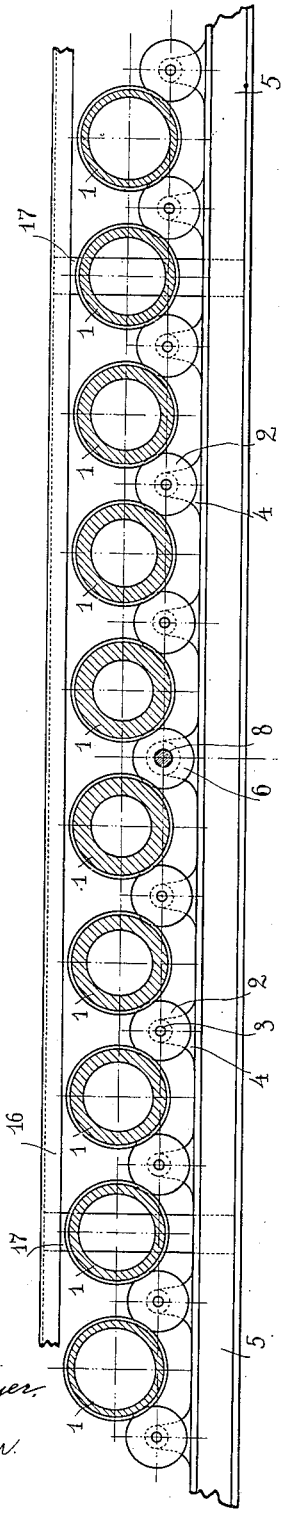
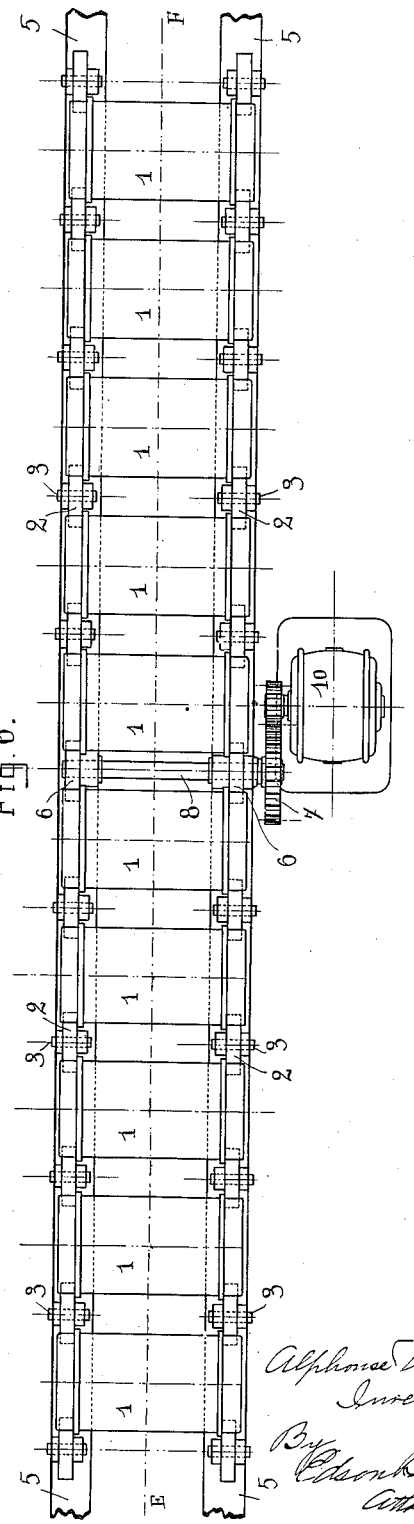

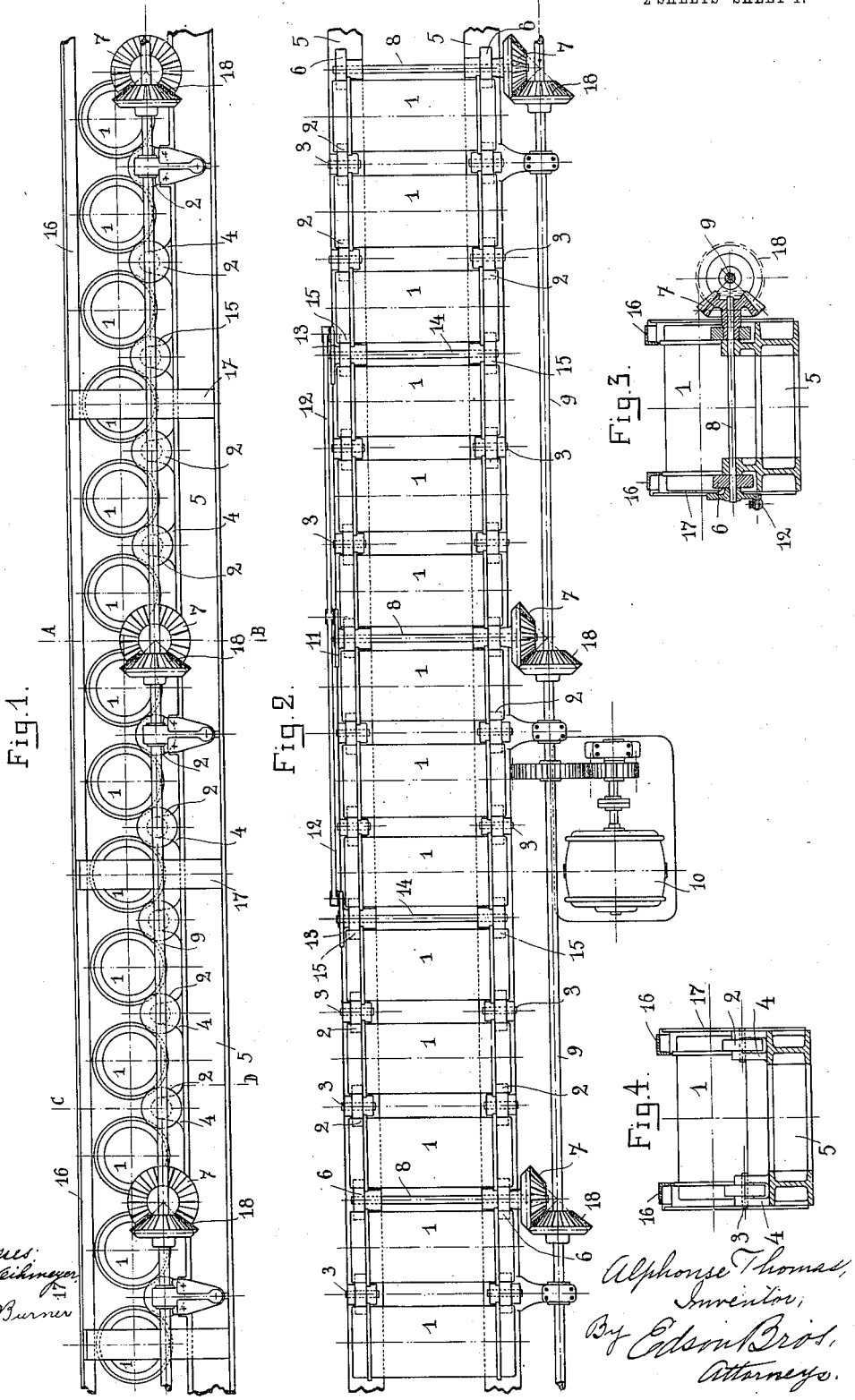

UNITED STATES PATENT OFFICE.

ALPHONSE THOMAS, OF CLABECQ, BELGIUM.

TRAIN OF CONVEYER-ROLLS.

No. 896,172.  Specification of Letters Patent.  Patented Aug. 18, 1908.

Application filed November 1, 1907. Serial No. 400,265.

*To all whom it may concern:*

Be it known that I, ALPHONSE THOMAS, a subject of the King of Belgium, residing at Clabecq, in the Kingdom of Belgium, have invented certain new and useful Improvements in Trains of Conveyer-Rolls, of which the following is a specification.

This invention relates to trains of conveyer rolls and particularly to such as are employed in rolling mills for conveying the bars. In known arrangements of this kind the conveyer rolls are traversed by a shaft supported in bearings and driven directly by gears, connecting rods or the like. This method of driving necessitates a very considerable motive power, a great part of which is absorbed by the friction of the transmission parts; another disadvantage consists in that these parts wear rapidly and it is very difficult to replace them.

The present invention has for its object to obviate these defects and consists broadly in dispensing with the shafts of the conveyer rolls and in transmitting the movement to these rolls by the intermediary of rollers upon which the conveyer rolls rest; the transmission rollers which are provided with shafts mounted in suitable supports are controlled in any suitable manner and drive the conveyer rolls by friction. The conveyer rolls in their turn drive the rollers on which they rest, this driving effort being augmented by the weight of the load, so that the driving of one pair of rollers is sufficient to drive several succeeding pairs with the rolls which they support. Thus for example a pair of mechanically driven rollers may be arranged in alternation with one or several pairs of undriven rollers, thereby considerably reducing the number of driving parts.

The conveyer rolls may be tubular and their diameters may vary at will while the absence of shafts eliminates the friction arising from expansion.

A construction in accordance with this invention in which the actuating rollers are driven by means of gear wheels and connecting rods, and a modification in which gear wheels only are used, are shown by way of examples in the accompanying drawings, in which:—

Figure 1 is a side elevation of the first construction. Fig. 2 is a plan view of same; Fig. 3 represents a cross section on the line A—B of Fig. 1. Fig. 4 represents a cross section on the line C—D of Fig. 1. Fig. 5 is a longitudinal section of the modified construction on the line E—F of Fig. 6. Fig. 6 is a plan view of same.

In the drawings 1, 1 indicate the conveyer rolls arranged upon rollers mounted upon shafts supported in bearings 4 fitted to supports 5 or cast integral therewith. The rollers 2 are merely idle driving rollers each of which is mounted on a small separate shaft 3. In Figs. 1 to 4, the rollers 6 and 15 mounted in pairs respectively on shafts 8 and 14 which connect the rollers of each pair, are driven mechanically and between two pairs of these rollers two pairs of idle rollers 2 are arranged.

The shafts 8 of the rollers 6 are provided at one extremity with bevel pinions 7 meshing with similar pinions 18 keyed upon the longitudinal shaft 9 actuated by the motor 10. One of these shafts 8 carries at its other end a crank 11 which by the intermediary of connecting rods 12 transmits the movement of rotation of the shaft 8 to cranks 13 keyed upon the shafts 14 of the rollers 15. Uprights 17 secured to the supports 5 carry guides 16, serving to guide the bars upon the conveyer rolls.

The operation of the apparatus is as follows:—The motor 10 drives the shaft 9 and the pinions 18 which rotate the pinions 7 and the shafts 8 of the rollers 6. The rollers 6 frictionally drive the rolls 1 which they support and these rolls drive the idle rollers 2 upon which they also rest; these rollers 2 cause rotation of the other rolls 1 which rest upon them and so on in succession up to the rollers 15 to which the rotation of the shaft 8 is transmitted directly by the connecting rods 12, which serve to supplement the frictional driving and balance the distribution of the motive power on the two series of rollers.

The number of driven rollers relatively to the other rollers may be increased or decreased according to circumstances and the driving may be effected entirely by means of connecting rods or entirely through gears, chains, cables or the like.

In the construction shown in Figs. 5 and 6, one pair of rollers 6 only are driven mechanically, which frictionally drive the whole set of rolls 1 and the idle rollers 2.

The rolls resting upon the positively driven rollers 6 are made heavier than the following rolls, the weight of which decreases gradually in order to increase the driving power of the first driven rolls.

Instead of driving the rollers mechanically, it is obvious that the conveyer rolls might be driven directly.

What I claim and desire to secure by Letters Patent of the United States is:—

1. In a train of conveyer rolls the combination with a series of conveyer rolls without axles of a series of rollers arranged in pairs upon and between which these conveyer rolls rest freely and means for positively driving one of the pairs of rollers in such a manner that they drive by friction the conveyer rolls and the other pairs of rollers.

2. In a train of conveyer rolls the combination with a series of supporting rollers arranged in pairs and means for positively driving one of the said pairs of rollers, of a series of conveyer rolls resting freely upon and between the said pairs of rollers, the arrangement being such that the supporting rollers and the conveyer rolls drive each other by friction.

3. In a train of conveyer rolls the combination with a series of idle rollers arranged in pairs, of a series of conveyer rolls resting freely upon and between the said pairs of idle rollers and means for positively driving one of the said conveyer rolls in such a manner that it drives by friction the series of idle rollers and the undriven rolls.

4. In a train of conveyer rolls the combination with a series of supporting rollers arranged in pairs, of a series of conveyer rolls resting freely upon and between the said pairs of rollers and means for positively driving one of the said conveyer rolls, the arrangement being such that the conveyer rolls and supporting rollers drive each other by friction.

5. In a train of conveyer rolls the combination with rollers arranged in pairs and means for mechanically driving one pair of said rollers, of conveyer rolls of varying weight resting upon and between the said pairs of rollers, the rolls resting upon the mechanically driven rollers being heavier than the following rolls the weight of which decreases gradually.

In testimony whereof I affix my signature in presence of two witnesses.

ALPHONSE THOMAS.

Witnesses:
H. T. E. KIRKPATRICK,
GREGORY PHELAN.